Figure 1:
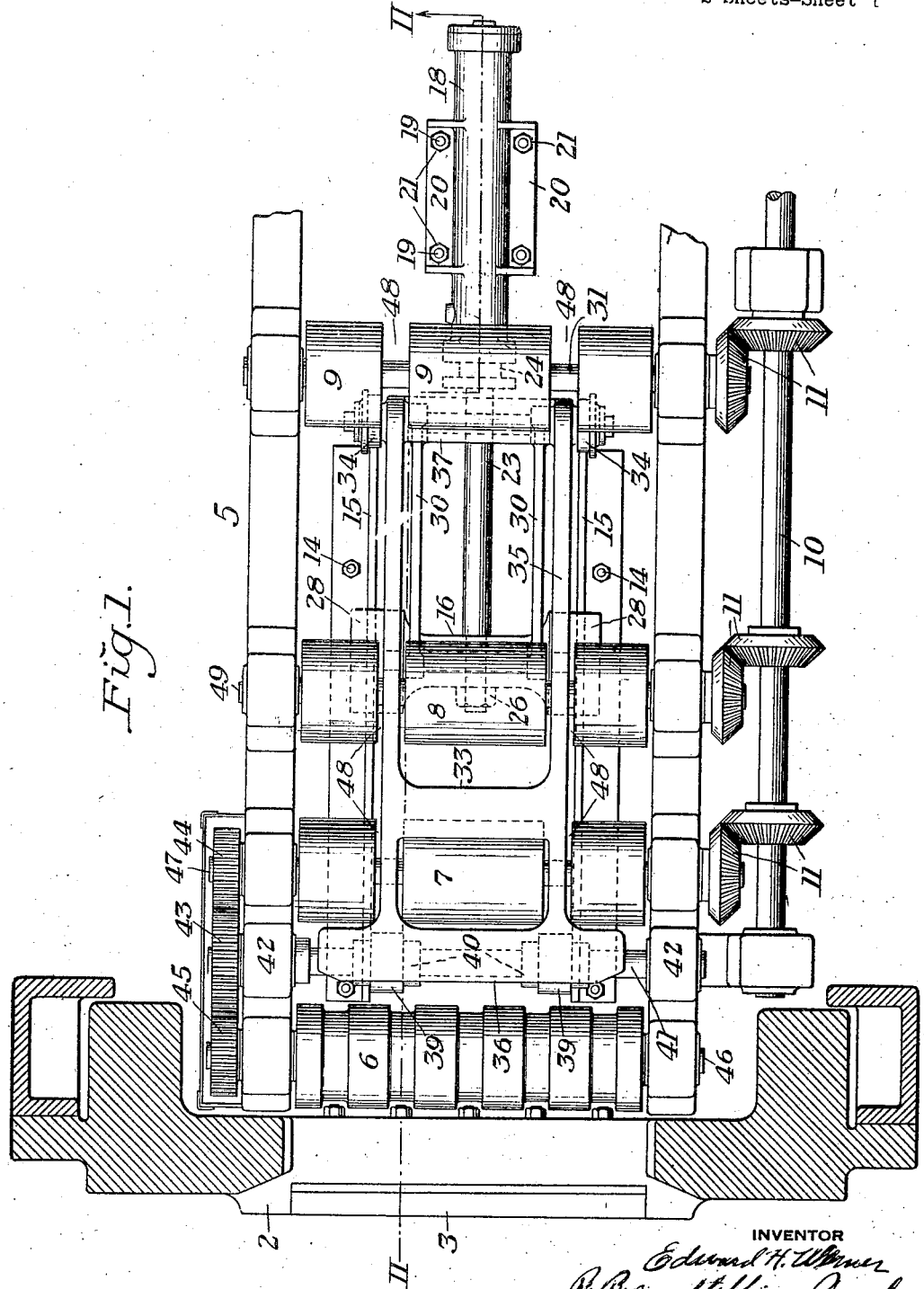

July 20, 1926.

E. H. WERNER

CROP END PUSHER

Filed June 14, 1924

1,593,520

2 Sheets-Sheet 1

INVENTOR
Edward H. Werner
By Byrnes, Stebbins & Parmelee
His Attys

July 20, 1926.
E. H. WERNER
CROP END PUSHER
Filed June 14, 1924
1,593,520
2 Sheets-Sheet 2
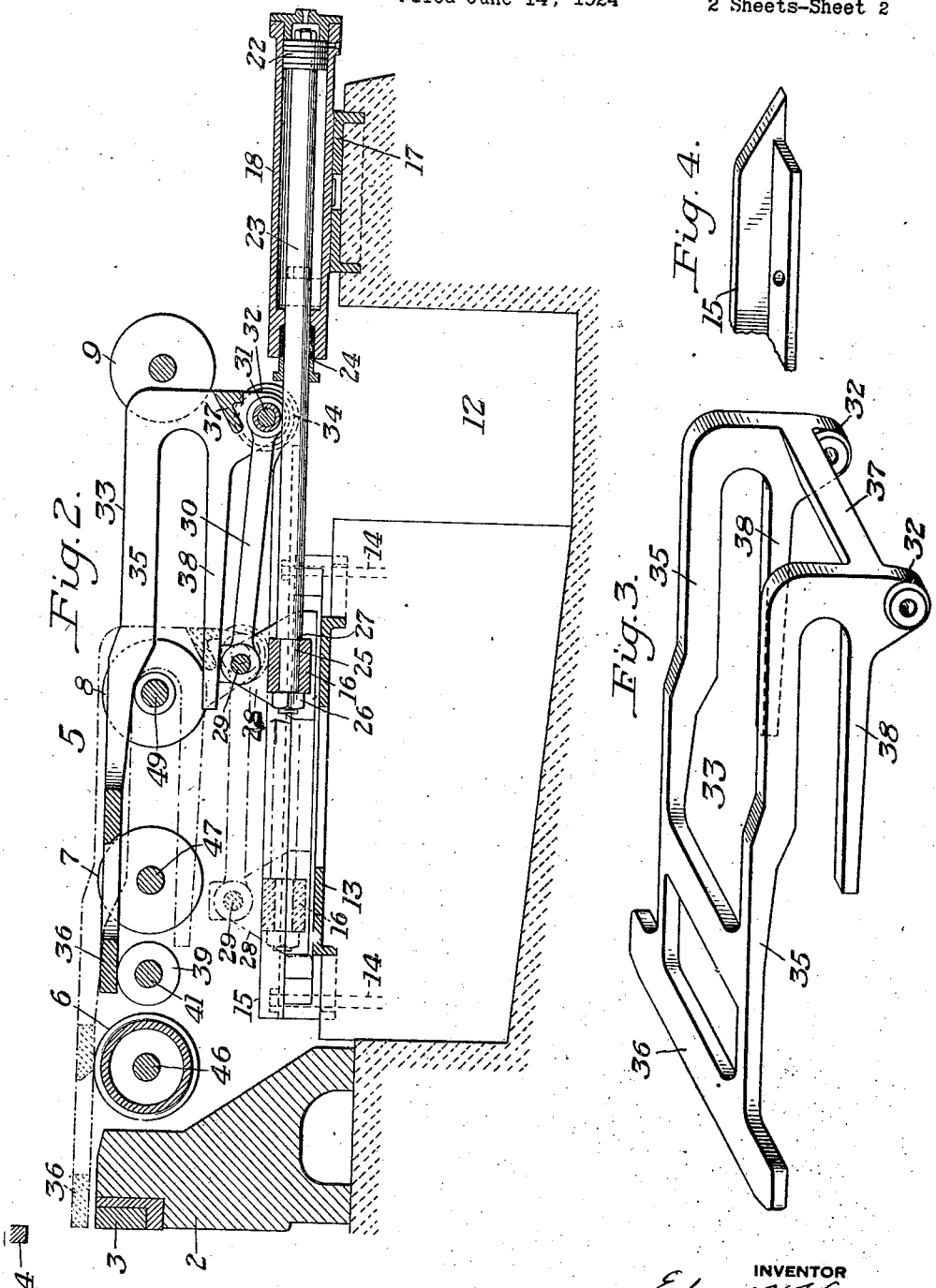
INVENTOR
Edward H. Werner
By Byrnes, Stebbins, Carmalee
His Attys

Patented July 20, 1926.

1,593,520

UNITED STATES PATENT OFFICE.

EDWARD H. WERNER, OF GRANITE CITY, ILLINOIS, ASSIGNOR TO UNITED ENGINEERING & FOUNDRY CO., OF PITTSBURGH, PENNSYLVANIA, A CORPORATION OF PENNSYLVANIA.

CROP-END PUSHER.

Application filed June 14, 1924. Serial No. 720,078.

In shearing slabs or billets, the operation of the shear is often considerably retarded by reason of the rear crop ends of the material not being fed entirely through the shear but remaining on the lower knife block. These crop ends have to be manually removed, thereby delaying operations.

By the present invention I provide a crop end pusher adapted to be associated with the delivery table of a shear for assisting the table in feeding the crop ends through the shear.

A preferred embodiment of the invention is shown in the drawings, in which:—
Figure 1 is a horizontal sectional view through the lower portion of a shear and showing in plan a portion of the delivery table and a crop end pusher constructed in accordance with my invention associated therewith, Figure 2 is a vertical longitudinal sectional view on the line II—II of Figure 1, Figure 3 is a perspective view of the pusher member, and Figure 4 is a detail view of an end portion of one of the tracks on which the pusher member travels.

In the illustrated embodiment of the invention the reference numeral 2 designates the lower knife block of the shear carrying the lower knife 3 with which cooperates an upper knife 4. Arranged at one side of the shear is a delivery table 5 having its end roller 6 positioned adjacent the knife block
2. Rearwardly of the roller 6 are other rollers 7, 8 and 9 driven by the usual jack shaft 10 through miter gears 11.

Beneath the forward end of the delivery table is a pit 12 and extending across the top of the pit is a base casting 13 which is anchored to the sides of the pit by bolts 14 embedded in the concrete foundation. Slidably mounted upon tracks 15 secured to the base casting by the bolts 14 is a cross head
16. These tracks have tapered rear ends, as shown in Figure 4. Mounted on the foundation adjacent the rear end of the pit is another base casting 17. A cylinder 18 is secured to the base 17 by bolts 19 embedded in the concrete foundation and extending through the base 17 and through integral flanges 20 at the sides of the cylinder. The upper ends of the bolts are screw-threaded and have nuts 21 mounted thereon, whereby the cylinder is removably secured in place.
Working in the cylinder 18 is a piston 22 having a piston rod 23 extending through a stuffing box 24 in one end of the cylinder. The forward end portion 25 of the piston is of reduced diameter and extends through the cross head 16, a nut 26 being mounted upon the screw-threaded end of the piston, whereby the cross head is secured upon the reduced portion 25 between the nut and the shoulder 27 between the reduced portion and the main portion of the piston.

The cross head has upwardly extending ears 28 at its opposite ends and extending between and through these ears is a horizontal rod 29. A pair of links 30 is journaled at one end upon this rod and at the other end upon a rod 31 which extends through downward extensions 32 at the rear end of a pusher member 33. Journaled upon the ends of the rod 31 at the outer sides of the extensions 32 is a pair of flanged wheels 34 which travel upon the tracks 15.

The pusher member is cast in one piece and comprises sides 35 having the downward extensions 32 integral with their rear ends and having the flat horizontal cross-bar 36 connecting their forward ends. The downward extensions 32 are connected by a transverse bar 37. Integral with the downward extensions 32 are forwardly extending arms 38 substantially parallel with but spaced below the sides 35.

The normal position of the pusher member is shown in full lines in Figures 1 and 2, in which position of the pusher the piston 22 is at the rear end of the cylinder 18. In this position of the pusher member, the cross bar 36 at the forward end thereof rests upon rollers 39 journaled between collars 40 on a shaft 41 arranged between the forward roller 6 and the roller 7 of the delivery table and journaled in bearings 42. A gear 43 is mounted upon one end of this shaft and meshes with gears 44 and 45 on the corresponding end of the shafts 46 and 47 of the rollers 6 and 7, whereby the drive is transmitted from the roller 7 to the roller 6. The rollers 7, 8 and 9 are each formed in three parts to provide annular spaces 48 to accommodate the sides 35 of the pusher member.

The operation of the apparatus is substantially as follows:

In the normal position of the pusher mechanism as shown in full lines in the drawings, the pusher member 33 is slightly below the line of delivery of the material and the flanged wheels 34 are at the rear tapered ends of the tracks 15. When it is desired to push a crop end through the shear, pressure fluid will be admitted to the rear end of the cylinder 18, thereby causing the piston 22 to move to the forward end of the cylinder and move the pusher member 33 forwardly. During the initial forward movement of the pusher member the flanged wheels 34 will ride up the inclined rear ends of the tracks 35, thereby elevating the rear end of the pusher member. When the forward end of the pusher member engages the surface of the roller 7 this end of the member will also be raised, thereby bringing the forward end of the pusher member in the same plane as the crop end resting on the lower knife block. During the further advance of the pusher member the forward edge of the cross-bar 36 will engage the rear edge of the crop end and the latter will be pushed completely through the shear as the pusher member completes its advancing movement. The advanced position of the pusher member is shown in dotted lines in Figure 2. Upward tilting movement of the pusher member about the rod 31 as the pusher member is advanced is limited by the engagement of the arms 38 with the shaft 49 of the roller 8. The pusher member is retracted by admitting fluid to the forward end of the cylinder 18.

While I have shown and described the preferred embodiment of my invention, it will be understood that the invention may be otherwise embodied without departing from the spirit of the invention or scope of the appended claims.

I claim:—

1. The combination with a shear and a roller table for delivering material thereto, of means associated with said roller table and normally positioned below the delivery line thereof for pushing the crop ends of material through the shear, substantially as described.

2. The combination with a shear and means for delivering material through the shear, of means normally positioned below the delivery line of the material for pushing the crop ends of the material through the shear, and means for operating said pusher means, including means for elevating said pusher means as it is advanced, substantially as described.

3. The combination with a shear and delivery means for passing material through the shear, of means associated with said delivery means for pushing the crop ends of the material through the shear, comprising a pusher member supported below the line of delivery of the material for reciprocation towards and from the shear, and means for operating said member, substantially as described.

4. The combination with a shear and means for delivering material thereto, of means associated with said delivery means for pushing the crop ends of the material through the shear, comprising tracks arranged below the delivery means, pusher means having supporting wheels running on said tracks, and means for reciprocating said pusher means towards and from the shear, substantially as described.

5. The combination with a shear and means for delivering material thereto, of means associated with said delivery means for pushing the crop ends of the material through the shear, comprising tracks arranged below the delivery means, a pusher member having its material engaging portion normally positioned below the delivery line of the material and having wheels running on said tracks, and means for reciprocating said pusher member towards and from the shear, said delivery means being arranged to effect raising of the material engaging portion of the pusher member during forward movement thereof, substantially as described.

6. The combination with a shear and a roller table for delivering material to the shear, of means associated with said table for pushing the crop ends of the material through the shear, comprising a pusher member, and means for reciprocating said member towards and from the shear, certain of the table rollers being formed in spaced sections to accommodate said member therebetween, substantially as described.

7. The combination with a shear and a roller table for delivering material to the shear, of means associated with said table for pushing the crop ends of the material through the shear, comprising a pusher member normally positioned below the delivery line of the material, certain of the table rollers being formed in spaced sections to accommodate said member therebetween, substantially as described.

8. The combination with a shear and a roller table for delivering material to the shear, of means associated with said table for pushing the crop ends of the material through the shear, comprising a pusher member normally positioned below the delivery line of the material, certain of the table rollers being formed in spaced sections to accommodate said member therebetween, tracks arranged below the delivery table, wheels carried by said member adjacent one end thereof and running on said tracks, means for reciprocating said member towards and from the shear, and supporting means engaging the lower side of said member, said tracks having cam portions engaged by said wheels to effect raising of the rear portion of said member during forward movement thereof, the forward end of the pusher member being raised by engagement with one of the table rollers during such forward movement, substantially as described.

9. The combination with a shear having a stationary lower knife block and a delivery roller arranged adjacent said block for passing material to be sheared over said block, of a pusher member for pushing the crop ends of the material through the shear, a roller arranged adjacent said delivery roller for normally supporting the material-engaging end of said member below the upper surface of said delivery roller, and means for reciprocating said member towards and from the shear, said delivery roller being effective for raising the material-engaging end of said member off said supporting roller onto said delivery roller during the movement of said member towards the shear, substantially as described.

10. The combination with a shear of a roller table for delivering material thereto, the last roller of the table being spaced from the shear proper, and a reciprocable pusher normally lying below the level of the material on the roller table and adapted for pushing crop ends of material across the space between the last roller of the table and the shear proper, substantially as described.

11. The combination with a shear of supporting means, a reciprocable pusher for pushing the crop ends of material over the supporting means and through the shear, said pusher being tiltable with respect to the supporting means and having means for preventing undue tilting thereof, substantially as described.

12. The combination with a shear of a roller table for normally controlling the feeding of material to the shear, and a reciprocable pusher normally out of engagement with the material being handled but adapted for movement into engagement with the crop end of the material for pushing it through the shear, substantially as described.

13. The combination with a shear and a roller table for delivering material thereto of a reciprocable pusher adapted to push crop ends of material through the shear, guides for the pusher over which it is adapted to move, the pusher being provided with means for causing upward movement thereof to bring it into engagement with the material and means for limiting such upward movement, substantially as described.

In testimony whereof I have hereunto set my hand.

EDWARD H. WERNER.

Certificate of Correction.

It is hereby certified that in Letters Patent No. 1,593,520, granted July 20, 1926, upon the application of Edward H. Werner, of Granite City, Illinois, for an improvement in "Crop-End Pushers," an error appears in the printed specification requiring correction as follows: Page 2, line 52, claim 2, strike out the words "through the shear" and insert instead *thereto;* and that the said Letters Patent should be read with this correction therein that the same may conform to the record of the case in the Patent Office.

Signed and sealed this 24th day of August, A. D. 1926.

[SEAL.]
M. J. MOORE,
*Acting Commissioner of Patents.*